(12) United States Patent
Jung

(10) Patent No.: US 8,625,396 B2
(45) Date of Patent: Jan. 7, 2014

(54) OPTICAL PICKUP AND OPTICAL INFORMATION STORAGE MEDIUM SYSTEM USING THE SAME

(75) Inventor: Jin-ho Jung, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/463,144

(22) Filed: May 3, 2012

(65) Prior Publication Data

US 2012/0281516 A1    Nov. 8, 2012

(30) Foreign Application Priority Data

May 6, 2011    (KR) .................... 10-2011-0043084

(51) Int. Cl.
G11B 7/135    (2012.01)
(52) U.S. Cl.
USPC .................................. 369/44.24; 369/112.15
(58) Field of Classification Search
None
See application file for complete search history.

(56) References Cited

U.S. PATENT DOCUMENTS

| | | | | |
|---|---|---|---|---|
| 5,235,581 A * | 8/1993 | Miyagawa et al. | ......... | 369/44.12 |
| 5,487,060 A * | 1/1996 | Rosen et al. | .................... | 369/118 |
| 7,345,981 B2 * | 3/2008 | Kim et al. | ................. | 369/112.03 |
| 7,358,471 B2 * | 4/2008 | Yamamoto | .................. | 250/201.5 |
| 7,492,676 B2 * | 2/2009 | Okamoto et al. | .......... | 369/44.24 |
| 7,755,834 B2 * | 7/2010 | Koyanagi et al. | ............. | 359/566 |
| 7,924,682 B2 * | 4/2011 | Yoo et al. | .................. | 369/112.07 |
| 8,031,577 B2 * | 10/2011 | Shiono | ..................... | 369/112.28 |
| 2004/0090901 A1 * | 5/2004 | Katayama | ................ | 369/112.24 |
| 2006/0291360 A1 * | 12/2006 | Maeda et al. | .............. | 369/53.23 |
| 2007/0201324 A1 * | 8/2007 | Hirono | ........................ | 369/44.24 |
| 2007/0242575 A1 * | 10/2007 | Nakamura et al. | ......... | 369/44.24 |
| 2007/0274188 A1 * | 11/2007 | Kikuchi | .................... | 369/112.01 |
| 2008/0062851 A1 * | 3/2008 | Hayashi | ................... | 369/112.24 |
| 2008/0165641 A1 * | 7/2008 | Yoo et al. | .................. | 369/47.17 |
| 2008/0175110 A1 * | 7/2008 | Yamasaki et al. | .......... | 369/44.24 |
| 2008/0316891 A1 * | 12/2008 | Vrehen et al. | .................. | 369/94 |
| 2009/0003155 A1 * | 1/2009 | Tanabe | ......................... | 369/47.5 |
| 2009/0022037 A1 * | 1/2009 | Hotta et al. | .............. | 369/112.16 |

(Continued)

FOREIGN PATENT DOCUMENTS

| | | | |
|---|---|---|---|
| JP | 2001-273640 A | 10/2001 |
| JP | 2004-46916 A | 2/2004 |

(Continued)

OTHER PUBLICATIONS

Korean Office Action issued Jan. 18, 2013 in counterpart Korean Patent Application No. 10-2011-0043084 (4 pages, in Korean).

*Primary Examiner* — Peter Vincent Agustin
(74) *Attorney, Agent, or Firm* — NSIP Law

(57) ABSTRACT

An optical pick-up is provided. The optical pick-up includes a light source, a first objective lens configured to focus light emitted from the light source on a high-density optical information storage medium, a photo-detector configured to detect a signal by receiving light reflected from the high-density optical information storage medium, an optical-path changer configured to convert a travel path of incident light to allow the light emitted from the light source to proceed toward the high-density optical information storage medium, and to allow the light reflected from the high-density optical information storage medium to proceed toward the photo-detector, and a blocking device disposed in an optical path of signal light reflected from a target reproducing/recording layer of the high-density optical information storage medium, passes through the first objective lens, and proceeds toward the photo-detector.

19 Claims, 9 Drawing Sheets

(56) References Cited

U.S. PATENT DOCUMENTS

| | | | |
|---|---|---|---|
| 2009/0201787 A1* | 8/2009 | Ogasawara et al. | 369/112.23 |
| 2009/0262633 A1* | 10/2009 | Saito et al. | 369/112.23 |
| 2009/0310468 A1* | 12/2009 | Kimura | 369/112.23 |
| 2010/0034073 A1* | 2/2010 | Mori et al. | 369/112.24 |
| 2010/0246347 A1* | 9/2010 | Tanaka et al. | 369/47.15 |
| 2012/0281516 A1* | 11/2012 | Jung | 369/103 |

FOREIGN PATENT DOCUMENTS

| | | |
|---|---|---|
| JP | 2005-235342 A | 9/2005 |
| JP | 2009-301644 | 12/2009 |
| KR | 10-0580549 B1 | 10/2006 |
| KR | 10-2007-0086103 | 8/2007 |
| KR | 10-2007-0089070 | 8/2007 |

* cited by examiner

OPTICAL PICKUP AND OPTICAL INFORMATION STORAGE MEDIUM SYSTEM USING THE SAME

CROSS-REFERENCE TO RELATED PATENT APPLICATION

This application claims the benefit under 35 U.S.C. §119(a) of Korean Patent Application No. 10-2011-0043084, filed on May 6, 2011, in the Korean Intellectual Property Office, the entire disclosure of which is incorporated herein by reference for all purposes.

BACKGROUND OF THE INVENTION

1. Field of the Invention

The following description relates to an optical pick-up and an optical information storage medium system using the optical pick-up.

2. Description of the Related Art

Optical information storage media including, for example, optical discs, are recorded and readout by optical recording/reproducing apparatuses. The optical recording/reproducing apparatuses may use laser beams having different wavelengths and objective lenses having different numerical apertures, according to the amount of information to be stored. In other words, as the capacity of an optical disc is increased, an objective lens with a light source having a shorter wavelength or with a greater numerical aperture may be used. For example, in a case of a compact disc (CD), a beam having a wavelength of about 780 nm and an objective lens having a numerical aperture of about 0.45 are used, in a case of a digital versatile disc (DVD), a beam having a wavelength of about 650 nm and an objective lens having a numerical aperture of about 0.6 are used, and in a case of a Blu-ray Disc (BD), a beam having a wavelength of about 405 nm and an objective lens having a numerical aperture of about 0.85 are used. The BD having a greater capacity than the DVD, which has a greater capacity than the CD.

As described above, in order to increase the density of an optical disc, a size of a light spot formed on the optical disc is decreased. In order to decrease the size of the light spot, a wavelength of a beam is decreased, and/or a numerical aperture of an objective lens is increased.

As another aspect, an expensive component is used to decrease the wavelength of the beam, and in response to the numerical aperture of the objective lens being increased, a focus depth is decreased by an amount corresponding to the square of the numerical aperture. A coma aberration is increased by an amount corresponding to the cube of the numerical aperture, so that an increase in the density of the optical disc, by decreasing the size of the light spot, may be limited.

Due to an increase in demand the optical disc with a larger capacity, a multilayer structure having more than one recording layer is used. Thus, the recording capacity of an optical disc having at least two recording layers formed on one side or both sides of the optical disc may be greater than the recording capacity of an optical disc having a single recording layer.

As described above, a multilayer optical disc may be used to increase a capacity of the optical recording/reproducing apparatuses. As another aspect, in response to the multilayer optical disc being used, light reflected from an adjacent layer other than a target reproducing/recording layer creates interference with signal light. The interference with signal light may create noise.

In general, a differential push-pull (DPP) method may correct an offset of a push-pull signal that is generated in response to an eccentricity disc being reproduced. The differential push-pull (DPP) method may be selected as a tracking method of a recordable optical disc. According to a general DPP method, a grating may be used to divide light into $0^{th}$-order light (main light) and two first-order lights (sub-lights). In consideration of an efficient use of light, a ratio of – first-order light: $0^{th}$-order light:+ first-order light with respect to the amounts of divided lights may be approximately 1:10:1.

In response to the DPP method being used to detect a tracking error signal in a dual-layer optical disc having two recording layers, $0^{th}$-order light reflected from an adjacent layer may overlap with first-order light reflected from a target reproducing/recording layer causing a deterioration of the tracking error signal. In other words, the amount of light of $0^{th}$-order light reflected from the target reproducing/recording layer is significantly different from the amount of light of the $0^{th}$-order light reflected from the adjacent layer. On the other hand, the amount of light of the first-order light reflected from the target reproducing/recording layer is not significantly different from the amount of light of the $0^{th}$-order light reflected from the adjacent layer. Thus, the $0^{th}$-order light of the adjacent layer significantly affects a differential signal (a sub push-pull (SPP) signal with respect to sub-light) used to detect the tracking error signal in the DPP method.

In order to prevent the SPP signal from being unstable due to interlayer interference light, a one-beam tracking method has been proposed. The one-beam tracking method does not use sub-lights but instead uses main light. As another aspect, in the one-beam tracking method, the amount of light of the signal light is great, but the amount of light of the signal light is not free of interlayer interference. In response to a multilayer optical disc being embodied, an interlayer gap may be further decreased. In addition, as the interlayer gap decreases, a push-pull detection signal with respect to main light, i.e., a main push-pull (MPP) signal may further be deteriorated.

SUMMARY OF THE INVENTION

According to an aspect, an optical pick-up is provided. The optical pick-up includes a light source, a first objective lens configured to focus light emitted from the light source on a high-density optical information storage medium, a photo-detector configured to detect a signal by receiving light reflected from the high-density optical information storage medium, an optical-path changer configured to convert a travel path of incident light to allow the light emitted from the light source to proceed toward the high-density optical information storage medium, and to allow the light reflected from the high-density optical information storage medium to proceed toward the photo-detector, and a blocking device disposed in an optical path of signal light reflected from a target reproducing/recording layer of the high-density optical information storage medium, passes through the first objective lens, and proceeds toward the photo-detector. The blocking device includes a blocking region around a signal light transmission region to block interlayer interference light reflected from a layer other than the target reproducing/recording layer, in response to the high-density optical information storage medium having a plurality of recording layers.

In order to pass the signal light without blocking the signal light in response to the first objective lens being shifted due to actuating, the signal light transmission region of the blocking device may be formed to configure a width of the signal light transmission region in the shift direction of the first objective lens is greater than a width of the signal light.

The optical pick-up may include a hologram device disposed in an optical path between the blocking device and the photo-detector and having a hologram region configured to divide a portion of a light region of the signal light into 0th-order light and first-order light to obtain a tracking error signal from a detection signal of the first-order light.

The signal light may be diffracted into 0th-order diffracted light, − first-order diffracted light, and + first-order diffracted light, and may include a first overlapping region in which the 0th-order diffracted light and the + first-order diffracted light overlap with each other, a second overlapping region in which the 0th-order diffracted light and the − first-order diffracted light may overlap with each other, the second overlapping region being separate from the first overlapping region, and a non-overlapping region may include the 0th-order diffracted light between the first overlapping region and the second overlapping region, the hologram device may include a first hologram region that corresponds to a light region comprising the first overlapping region, a second hologram region that corresponds to a light region comprising the second overlapping region, the second hologram region being separate from the first hologram region in a radial direction, a light transmission region disposed between the first hologram region and the second hologram region and configured to transmit a central portion of the non-overlapping region of the signal light, and third and fourth hologram regions configured to bisect the rest of the portions of the non-overlapping region of the signal light in a radial direction, the first through fourth hologram regions configured to divide incident light into 0th-order light and first-order light, and the photo-detector may include a first light-receiving part configured to detect a reproducing signal or a focus error signal by detecting light that straightly passes through the hologram device, and a second light-receiving part configured to detect a tracking error signal from first-order lights diffracted in the first through fourth hologram regions.

The second light-receiving part may include first through fourth light-receiving regions configured to receive the first-order lights diffracted in the first through fourth hologram regions, respectively, and in response to the first hologram region and the third hologram region being disposed in parallel, the second hologram region and the fourth hologram region being disposed in parallel, and detection signals of the first through fourth light-receiving regions being E, F, G, and H, the tracking error signal detected may satisfy the following Equation [Equation] $TES=(E-F)-k(G-H)$ where, $k$ is an adjusting coefficient.

The high-density optical information storage medium may include a Blu-ray Disc (BD).

The optical pick-up may further include a collimating lens disposed in the optical path between the light source and the first objective lens and configured to collimate light emitted by the optical-path changer.

The hologram device may be disposed in the optical path of the signal light between the optical-path changer and the blocking device.

As another aspect, an optical pick-up is provided. The optical pick-up includes a light source, a first objective lens configured to focus light emitted from the light source on a high-density optical information storage medium, a light source unit configured to emit a plurality of lights having different wavelengths that are appropriate for a plurality of low-density optical information storage media having different recording densities and different formats, a second objective lens configured to converge incident light from the light source unit and form an light spot to record and/or reproduce on or from the plurality of low-density optical information storage media, a photo-detector configured to detect a signal by receiving light reflected from the high-density optical information storage medium, an optical-path changer configured to convert a travel path of incident light to allow the light emitted from the light source and the light source unit to proceed toward the high-density optical information storage medium, and to allow the light reflected from the high-density optical information storage medium to proceed toward the photo-detector, and a blocking device disposed in an optical path of signal light reflected from a target reproducing/recording layer of the high-density optical information storage medium, passes through the first objective lens, and proceeds toward the photo-detector. The blocking device includes a blocking region around a signal light transmission region to block interlayer interference light reflected from a layer other than the target reproducing/recording layer, in response to the high-density optical information storage medium having a plurality of recording layers.

In order to pass the signal light without blocking the signal light even in response to the first objective lens being shifted due to actuating, the signal light transmission region of the blocking device may be formed to configure a width of the signal light transmission region in the shift direction of the first objective lens is greater than a width of the signal light.

The optical pick-up may further include a hologram device disposed on an optical path between the blocking device and the photo-detector and having a hologram region configured to divide a portion of a light region of the signal light into 0th-order light and first-order light to obtain a tracking error signal from a detection signal of the first-order light.

The signal light may be diffracted into 0th-order diffracted light, − first-order diffracted light, and + first-order diffracted light, and includes a first overlapping region in which the 0th-order diffracted light and the + first-order diffracted light overlap with each other, a second overlapping region in which the 0th-order diffracted light and the − first-order diffracted light may overlap with each other, the second overlapping region being separate from the first overlapping region, and a non-overlapping region including the 0th-order diffracted light between the first overlapping region and the second overlapping region, the hologram device may include a first hologram region that corresponds to a light region comprising the first overlapping region, a second hologram region that corresponds to a light region comprising the second overlapping region, the second hologram region being separate from the first hologram region in a radial direction, a light transmission region disposed between the first hologram region and the second hologram region and configured to transmit a central portion of the non-overlapping region of the signal light, and third and fourth hologram regions configured to bisect the rest of the portions of the non-overlapping region of the signal light in a radial direction, the first through fourth hologram regions configured to divide incident light into 0th-order light and first-order light, and the photo-detector may include a first light-receiving part configured to detect a reproducing signal or a focus error signal by detecting light that straightly passes through the hologram device, and a second light-receiving part configured to detect a tracking error signal from first-order lights diffracted in the first through fourth hologram regions, in response to the high-density optical information storage medium being recorded/reproduced.

The second light-receiving part may include first through fourth light-receiving regions configured to receive the first-order lights diffracted in the first through fourth hologram regions, respectively, and in response to the first hologram region and the third hologram region being disposed in parallel, the second hologram region and the fourth hologram region being disposed in parallel, and detection signals of the first through fourth light-receiving regions being E, F, G, and H, the tracking error signal detected may satisfy the following Equation [Equation] TES=(E−F)−k(G−H) where, k is an adjusting coefficient.

The optical pick-up may further include a diffraction device configured to divide light incident from the light source unit into main light and sub-light. The photo-detector may further include a third light-receiving part, each of the first and third light-receiving parts of the photo-detector comprises a main light receiving part configured to receive the main light and a sub-light receiving part configured to receive the sub-light so as to detect an information signal or an error signal by receiving light reflected from the plurality of low-density optical information storage media, and the main light receiving part of the first light-receiving part detects a reproducing signal or a focus error signal in response to the high-density optical information storage medium being recorded/reproduced.

The plurality of low-density optical information storage media may include a digital versatile disc (DVD) and a compact disc (CD), and the light source unit may emit light having a first wavelength appropriate for the DVD, and light having a second wavelength appropriate for the CD.

The high-density optical information storage medium may include a Blu-ray Disc (BD).

An optical information storage medium system may include the optical pick-up. The optical pick-up may be mounted to be configured to move in a radial direction of an optical information storage medium, and may reproduce information recorded on the optical information storage medium or record information on the optical information storage medium, and a control unit may control the optical pick-up.

In order to pass the signal light without blocking the signal light even in response to the first objective lens being shifted due to actuating, the signal light transmission region of the blocking device may be formed so that a width of the signal light transmission region in the shift direction of the first objective lens is greater than a width of the signal light.

The optical pick-up may further include a hologram device disposed on an optical path between the blocking device and the photo-detector and that has a hologram region configured to divide a portion of a light region of the signal light into 0th-order light and first-order light so as to obtain a tracking error signal from a detection signal of the first-order light.

The signal light may be diffracted into 0th-order diffracted light, − first-order diffracted light, and + first-order diffracted light, and may include a first overlapping region in which the 0th-order diffracted light and the + first-order diffracted light overlap with each other, a second overlapping region in which the 0th-order diffracted light and the − first-order diffracted light may overlap with each other, the second overlapping region being separate from the first overlapping region, and a non-overlapping region including only the 0th-order diffracted light between the first overlapping region and the second overlapping region, the hologram device may include a first hologram region that corresponds to a light region comprising the first overlapping region, a second hologram region that corresponds to a light region comprising the second overlapping region, the second hologram region being separate from the first hologram region in a radial direction, a light transmission region may be disposed between the first hologram region and the second hologram region and may be configured to transmit a central portion of the non-overlapping region of the signal light, and third and fourth hologram regions may be configured to bisect the rest of the portions of the non-overlapping region of the signal light in a radial direction, the first through fourth hologram regions configured to divide incident light into 0th-order light and first-order light, and the photo-detector may include a first light-receiving part configured to detect a reproducing signal or a focus error signal by detecting light that straightly passes through the hologram device; and a second light-receiving part configured to detect a tracking error signal from first-order lights diffracted in the first through fourth hologram regions.

The second light-receiving part comprises first through fourth light-receiving regions configured to receive the first-order lights diffracted in the first through fourth hologram regions, respectively, and in order to the first hologram region and the third hologram region being disposed in parallel, the second hologram region and the fourth hologram region being disposed in parallel, and detection signals of the first through fourth light-receiving regions being E, F, G, and H, the tracking error signal detected satisfies the following Equation [Equation] TES=(E−F)−k(G−H) where, k is an adjusting coefficient.

The optical information storage medium system may further include a light source unit configured to emit a plurality of lights having different wavelengths that are appropriate for a plurality of low-density optical information storage media that have different recording densities and different formats, and a second objective lens configured to converge incident light from the light source unit and form an light spot to record and/or reproduce on or from the plurality of low-density optical information storage media.

Other features and aspects may be apparent from the following detailed description, the drawings, and the claims.

Figure 1:
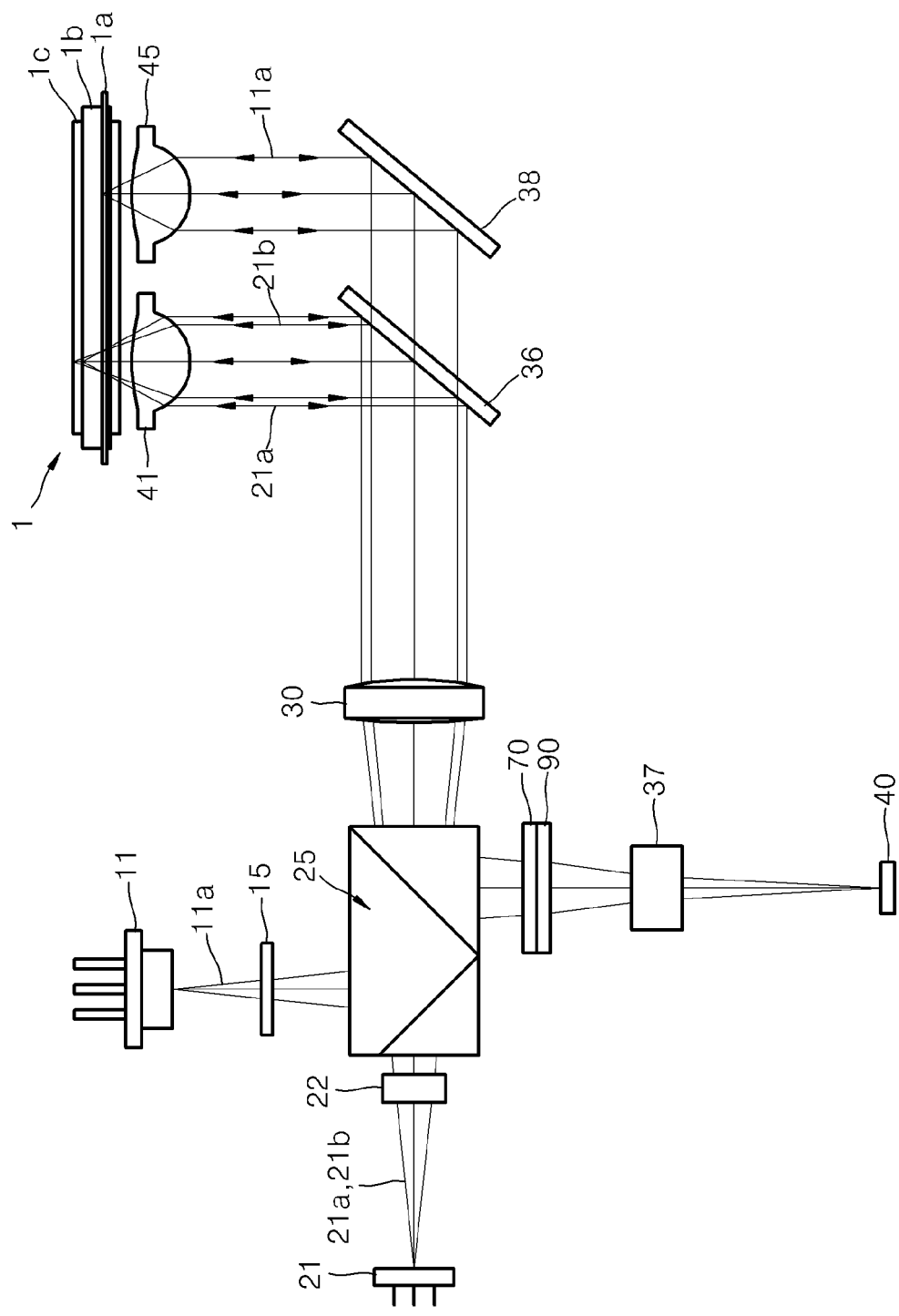
FIG. 1 illustrates an example of a configuration of an optical pick-up.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE INVENTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

In an optical information storage medium system according to one or more example, a one-beam tracking method may be used in recording and reproducing of a multilayer high-density optical information storage medium to reduce interference of a tracking error signal due to interlayer interference light.

In a multilayer optical information storage medium having a plurality of layers, for example, a dual-layer optical information storage medium having two layers, a layer close to a light incident surface of the dual-layer optical information storage medium may refer to a layer L1, and a layer relatively far from the light incident surface may refer to a layer L0. The layer L1 has about 30% reflection and about 70% transmission, and the layer L0 has about 95% reflection and about 5% transmission. Due to a characteristic of the dual-layer optical information storage medium, in response to the layer L1 being reproduced/recorded, reflected light that passes through the layer L1 is defocused in the layer L0. On the other hand, in response to the layer L0 being reproduced/recorded, reflected light is defocused in the layer L1. The reflected light generated by an adjacent layer is defocused, so that, in response to the reflected light being formed in a photo-detector, the beam size of the reflected light is increased. In response to light being spread due to the increased beam size of the reflected light from the adjacent layer, the reflected light may affect signal light but not significantly. However, in response to the beam size of the reflected light from the adjacent layer being small (but the beam size being greater than the signal light), the reflected light may significantly affect the signal light.

In a DVD, which may be a dual-layer optical disc, an interlayer gap may be sufficiently large so that, in response to the reflected light from the adjacent layer being defocused and formed in the photo-detector, the reflected light may have a relatively large size. Thus, the reflected light may not significantly affect the signal light. However, in a case of a high-density optical information storage medium such as a Blu-ray Disc (BD) having the storage capacity greater than a DVD, a numerical aperture of an objective lens may be greater than a numerical aperture of an objective lens of the DVD, and a thickness between a light incident surface and a recording layer is about 0.1 mm and is significantly less than a thickness between a light incident surface and a recording layer of the DVD.

In response to the high-density optical information storage medium such as the BD having a plurality of recording layers, an interlayer gap may be proportional to a focus depth. In this regard, the focus depth may correspond to $\lambda/NA^2$ (where $\lambda$ relates to a wavelength of light and NA relates to a numerical aperture), so that the interlayer gap of the DVD dual-layer optical disc relates to about 55 μm. On the other hand, the interlayer gap of the BD may be equal to or less than half of 55 μm. In other words, the interlayer gap of the BD may be significantly less than the interlayer gap of the DVD dual-layer optical disc. Also, in response to the number of recording layers stacked on one side being increased, the interlayer gap may be further decreased.

Thus, in response to the high-density optical information storage medium such as the BD having a greater density than a density of the DVD dual-layer optical disc, the BD having a plurality of recording layers, for example, two layers or four layers, the interlayer gap therebetween may be significantly small so that a smaller beam size of light reflected from an adjacent layer is formed in the photo-detector. The smaller beam size of light is in comparison to beam size of light in the DVD dual-layer optical disc. Thus, in a differential push-pull (DPP) method, interlayer interference noise may significantly affect a sub push-pull (SPP) signal where the beam size of signal light is less than the beam size of a main push-pull (MPP) signal because, in response to the SPP signal being amplified k times to remove a DC offset component of a tracking error signal, the interlayer interference noise may also be amplified k times, so that DC variation totally applies to a DPP signal. The differential push-pull (DPP) method may be a general tracking method with respect to a land/groove-type optical information storage medium.

In comparison to the DPP method, in a one-beam tracking method, usage of the SPP signal weaker than the MPP signal with respect to interlayer interference may be excluded. As a result, the stability of a tracking signal may be improved. As another aspect, because the interlayer interference may also affect the MPP signal, the one-beam tracking method may not be completely free from the interlayer interference.

In response to a multilayer optical information storage medium being embodied, an interlayer gap may be further decreased, and as the interlayer gap decreases, the MPP signal may further deteriorate. Thus, in a multi-layer optical information storage medium system, it may be beneficial to reduce the deterioration of the MPP signal.

FIG. 1 illustrates an example of an optical configuration of an optical pick-up. The optical pick-up according to the present example may be compatible with a high-density optical information storage medium and a plurality of low-density optical information storage media. The plurality of low-density optical information storage media may have different recording densities and formats. For example, the optical pick-up may be compatible with a BD-based optical disc (hereinafter, referred to as "BD"), a digital versatile disc (DVD)-based optical disc (hereinafter, referred to as "DVD") and a compact disc (CD)-based optical disc (hereinafter, referred to as "CD"). In another example, the optical pick-up may be compatible with the BD and the DVD. In yet another example, the optical pick-up may be compatible with only the BD. The BD may correspond with the high-density optical information storage medium. The DVD and the CD may correspond with the low-density optical information storage media. Hereinafter, the present example may be related to a case in which the optical pick-up is compatible with the BD, the DVD, and the CD.

Referring to FIG. 1, the optical pick-up includes a light source 11 for a BD 1a as the high-density optical information storage medium, a first objective lens 45 configured to focus first light 11a on the BD 1a, a photo-detector 40, and a blocking device 70. The first light is incident from the light source 11 for the BD 1a and has a first wavelength. The photo-detector 40 may be configured to receive light reflected from an optical information storage medium 1 to detect an information signal or an error signal. The blocking device 70 may be configured to block interlayer interference light reflected from a layer other than a target reproducing/recording layer in response to the BD 1a having a plurality of recording layers. The optical pick-up may further include a hologram device 90 disposed in an optical path between the blocking device 70 and the photo-detector 40, and the hologram device 90 may be configured to determine a tracking error signal from a detection signal of first-order light. The first-order light is formed by dividing a portion of a light region of signal light into $0^{th}$-order light and the first-order light. The signal light may be reflected from the target reproducing/recording layer of the high-density optical information storage medium, i.e., the BD 1a.

Also, the optical pick-up may further include an optical-path changer 25 disposed in an optical path between the light source 11 and the first objective lens 45. The optical-path changer 25 may convert an optical path. The converted optical path may allow the light reflected from the optical information storage medium 1 to proceed to the photo-detector 40. Also, the optical pick-up may further include a half-wave plate 15 on an optical path between the light source 11 and the optical-path changer 25. The half-wave plate 15 may change a polarization of the first light 11a emitted from the light source 11. The optical pick-up may include a collimating lens 30 disposed in the optical path between the light source 11 and the first objective lens 45. The collimating lens 30 may collimate incident light.

In a case where the optical pick-up is compatible not only with the BD 1a but also low-density optical information storage media such as a DVD 1b and a CD 1c, the optical pick-up may include a light source unit 21 that emits a plurality of lights having different wavelengths. The plurality of lights may have different wavelengths appropriate for the DVD 1b and the CD 1c, the DVD 1b and the CD 1c having different recording densities and different thicknesses. The optical pick-up may include a diffraction device 22 configured to divide light incident from the light source unit 21 into main light and sub-light, and a second objective lens 41 configured to converge the incident light and then form a light spot to record, to reproduce, or a combination thereof on or from the optical information storage medium 1. The optical pick-up may further include an astigmatic lens 37. For example, the astigmatic lens 37 may be a cylindrical lens on an optical path between the optical-path changer 25 and the photo-detector 40, and may allow detection of a focus error signal according to an astigmatism method. Also, FIG. 1 illustrates mirror members 36 and 38 that change the directions of light incident from the light source 11 and light incident from the light source unit 21 toward the first objective lens 45 and the second objective lens 41. As another aspect, an optical system may exclude the mirror members 36 and 38.

The light source 11 may emit the first light 11a having a blue wavelength, which is used to record/reproduce on or from the BD 1a. The blue wavelength may have a wavelength of about 405 nm.

The first objective lens 45 may focus the first light 11a, which is incident from the light source 11, to the BD 1a. A numerical aperture of the first objective lens 45 may be about 0.85.

The light source unit 21 may emit the plurality of lights having different wavelengths. Thus, the plurality of lights having different wavelengths may be compatible with the low-density optical information storage media such as the DVD 1b and the CD 1c. The DVD 1b and the CD 1c may have different recording densities and different thicknesses. For example, the light source unit 21 may emit a second light 21a having a wavelength of about 650 nm and a third light 21b having a wavelength of about 780 nm. Light having a wavelength of about 650 nm may be appropriate for the DVD 1b. Light having a wavelength of about 780 nm may be appropriate for the CD 1c. The light source unit 21 may include twin light sources having two semiconductor lasers. In another example, the light source unit 21 may be configured to include first and second light sources that emit the second light 21a and the third light 21b, respectively. In addition, an optical-path combiner such as, for example, a beam splitter may be configured to combine optical paths of the second and third lights 21a and 21b emitted from the first and second light sources.

The second objective lens 41 may form a light spot on a desired focusing location on a plurality of optical information storage media. The light spot may have a desired size. In response to the optical pick-up according to the present example being compatible with the DVD 1b and the CD 1c, the second objective lens 41 may be configured to form light spots on the DVD 1b and the CD 1c, the light spots being appropriate for the DVD 1b and the CD 1c.

The diffraction device 22 may be configured to divide each of the second light 21a and the third light 21b into main light and sub-light. The second light 21a and the third light 21b may be incident from the light source unit 21.

Figure 2:
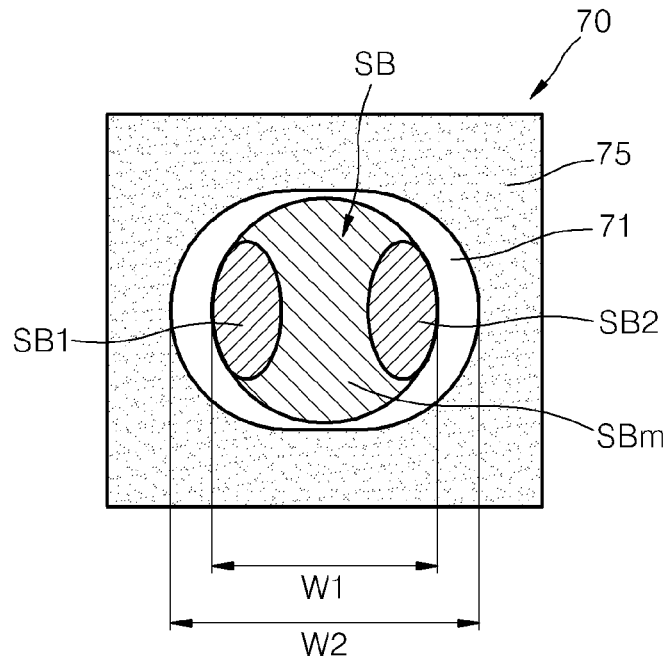
FIG. 2 illustrates an example of a blocking device in the optical pick-up of FIG. 1.

Referring to FIG. 2, the blocking device 70 is disposed on an optical path of signal light SB of the first light 11a. The first light 11a may be reflected from the target reproducing/recording layer of the high-density optical information storage medium, that is, the BD 1a. The reflected first light 11a may then pass through the first objective lens 45, and then may proceed to the photo-detector 40. In response to the high-density optical information storage medium, for example, the BD 1a, having a plurality of recording layers, in order to block interlayer interference light reflected from a layer other than the target reproducing/recording layer, the blocking device 70 has a signal light transmission region 71 configured to transmit the signal light SB and has a blocking region 75 located around the signal light transmission region 71 and configured to block the interlayer interference light. In order to pass the signal light SB without blocking it even in response to the first objective lens 45 being shifted due to actuating in a radial direction of the optical information storage medium 1, a width w2 of the signal light transmission region 71 may be greater than a width w1 of the signal light SB. The signal light transmission region 71 may be in the shift direction of the first objective lens 45.

The signal light SB may be reflected from the high-density optical information storage medium and then the reflected signal light SB may be diffracted into $0^{th}$-order diffracted light, − first-order diffracted light, and + first-order diffracted light. In this regard, the signal light SB may include a first overlapping region SB1, a second overlapping region SB2, and a non-overlapping region SBm. The first overlapping region SB1 may be a region in which the $0^{th}$-order diffracted light and the + first-order diffracted light overlap with each other. The second overlapping region SB2 may be a region in which the $0^{th}$-order diffracted light and the − first-order diffracted light overlap with each other and which is separate from the first overlapping region SB1. The non-overlapping region SBm may be a region including only the $0^{th}$-order diffracted light between the first overlapping region SB1 and the second overlapping region SB2.

The hologram device 90 may be disposed on the optical path between the blocking device 70 and the photo-detector 40. The hologram device 90 may include a hologram region configured to divide a portion of a light region of the signal light SB into $0^{th}$-order light and first-order light. The hologram region of the hologram device 90 may function as a hologram device with respect to the first light 11a and may not function as a hologram device with respect to the second light 21a and the third light 21b. The first light 11a may have the first wavelength for the high-density optical information storage medium such as the BD 1a. The second light 21a may have a second wavelength for the DVD 1b, and the third light 21b having a third wavelength for the CD 1c. In another example, the hologram region of the hologram device 90 may perform a diffraction function on the second light 21a having the second wavelength and the third light 21b having the third wavelength for the low-density optical information storage media such as the DVD 1b and the CD 1c. In this case, a receiving part of the photo-detector 40 may be configured so that first-order lights of the second light 21a and the third light 21b diffracted in the hologram region may not be received by the photo-detector 40.

Figure 3:
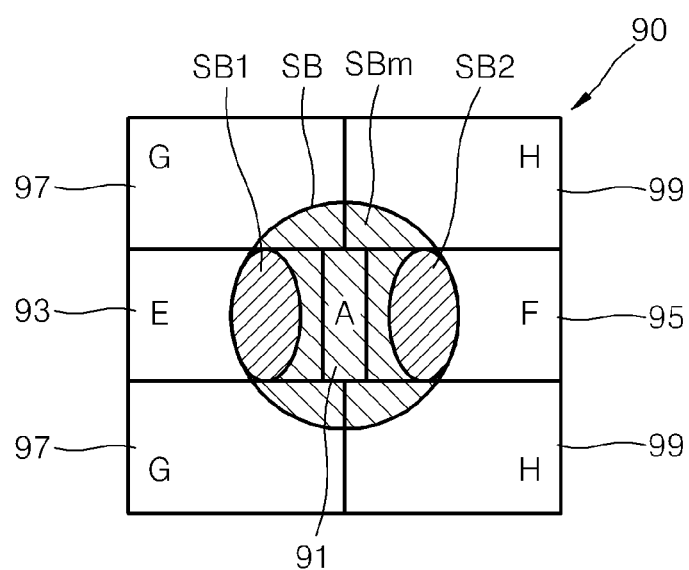
FIG. 3 illustrates an example of a hologram device in the optical pick-up of FIG. 1.

Referring to FIG. 3, the example of the hologram device 90 includes a first hologram region 93, a second hologram region 95, a light transmission region 91, and third and fourth hologram regions 97 and 99. The first hologram region 93 may correspond to a light region including the first overlapping region SB1. The second hologram region 95 may correspond to a light region including the second overlapping region SB2 and may be separate from the first hologram region 93 in a radial direction. The light transmission region 91 may be disposed between the first hologram region 93 and the second hologram region 95 and may transmit a central portion of the non-overlapping region SBm of the signal light SB. The third and fourth hologram regions 97 and 99 may bisect the rest of the portions of the non-overlapping region SBm of the signal light SB in a radial direction. The first through fourth hologram regions 93, 95, 97, and 99 may divide the signal light SB into $0^{th}$-order light and first-order light.

Figure 4:
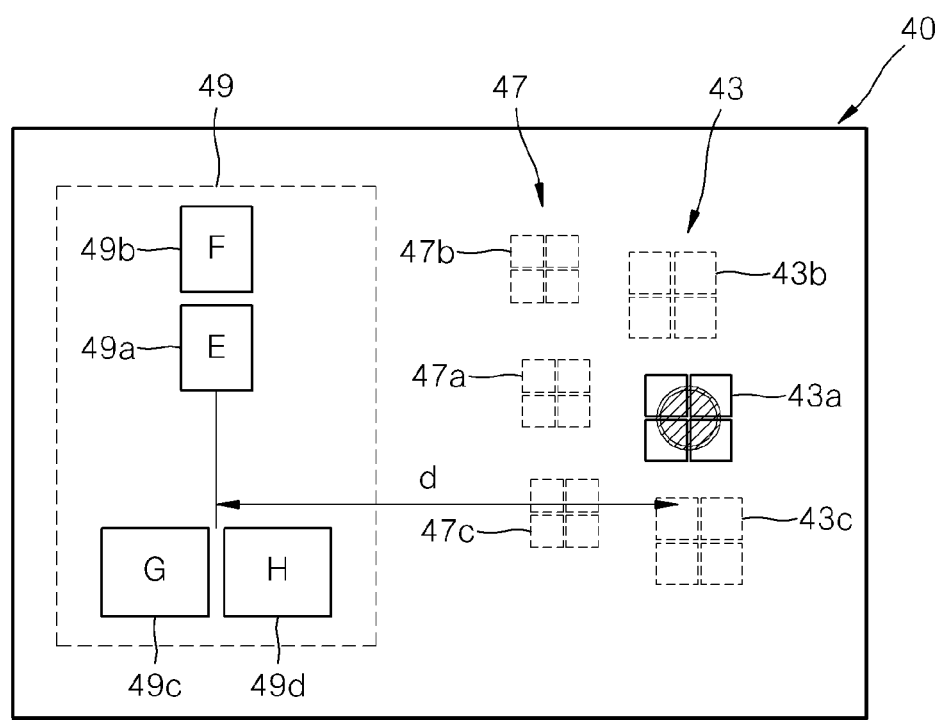
FIG. 4 illustrates an example of a photo-detector in the optical pick-up of FIG. 1.

Referring to FIG. 4, the example of the photo-detector 40 includes a first light-receiving part 43 configured to detect a reproducing signal or a focus error signal with respect to the high-density optical information storage medium such as the BD 1a by detecting light that directly passes through the hologram device 90, and a second light-receiving part 49 configured to detect a tracking error signal from first-order lights diffracted in the first through fourth hologram regions 93, 95, 97, and 99 of the hologram device 90 in response to the high-density optical information storage medium such as the BD 1a being recorded/reproduced. Also, in response to the optical pick-up being compatible with the low-density optical information storage media such as the DVD 1b and the CD 1c, the first light-receiving part 43 may detect a reproducing signal or a focus error signal by receiving one of the second light 21a reflected from the DVD 1b and the third light 21b reflected from the CD 1c, and the photo-detector 40 may further include a third light-receiving part 47 configured to detect a reproducing signal or a focus error signal by receiving another one of the second light 21a and the third light 21b. As described above, in response to the diffraction device 22 dividing each of the second light 21a and the third light 21b into the main light and the sub-light, the first light-receiving part 43 and the third light-receiving part 47 may respectively include main light receiving parts 43a and 47a configured to receive the main light, and sub-light receiving parts 43b and 43c, and 47b and 47c configured to receive the sub-light. For example, in response to the light source unit 21 emitting the second light 21a having the second wavelength appropriate for the DVD 1b and the third light 21b having the third wavelength appropriate for the CD 1c, the main light receiving part 43a and the sub-light receiving parts 43b and 43c of the first light-receiving part 43 may receive the second light 21a having the second wavelength appropriate for the DVD 1b, and the main light receiving part 47a and the sub-light receiving parts 47b and 47c of the third light-receiving part 47 may receive the third light 21b having the third wavelength appropriate for the CD 1c. The sub-light receiving parts 43b and 43c, and 47b and 47c may have a quadrisected structure, as illustrated in FIG. 4, to detect a push-pull signal. In another example, the sub-light receiving parts 43b and 43c, and 47b and 47c may have a bisected structure. For detection of a focus error signal according to astigmatism method, the main light receiving parts 43a and 47a may have a quadrisected structure. In this example, a reproducing signal or a focus error signal generated may be detected by the main light receiving part 43a of the first light-receiving part 43 in response to the high-density optical information storage medium such as the BD 1a being recorded/reproduced.

The second light-receiving part 49 includes first through fourth light-receiving regions 49a, 49b, 49c, and 49d configured to receive the first-order lights diffracted in the first through fourth hologram regions 93, 95, 97, and 99, respectively. In response to the first hologram region 93 and the third hologram region 97 being disposed in parallel in a direction crossing the radial direction, the second hologram region 95 and the fourth hologram region 99 may be disposed in parallel in a direction crossing the radial direction, and in response to an assumption that detection signals of the first through fourth light-receiving regions 49a, 49b, 49c, and 49d are E, F, G, and H, respectively, a tracking error signal TES detected by the second light-receiving part 49 may satisfy Equation 1.

$$TES=(E-F)-k(G-H) \quad \text{[Equation 1]}$$

(where k is an adjusting coefficient)

As described above, a multilayer optical disc having at least two layers, e.g., the multilayer BD 1a, may be configured to be the high-density optical information storage medium. Light may be reflected from a layer other than a target reproducing/recording layer and may proceed on the same optical path as the signal light SB, and in this regard, a portion of the light, i.e., interlayer interference light may be blocked by the blocking region 75 of the blocking device 70. The interlayer interference light may be reflected from the layer other than the target reproducing/recording layer, As another aspect, the blocking region 75 may not block the other portion of the interlayer interference light, and in order to avoid being affected by the other portion of the interlayer interference light which has not being blocked, the first light-receiving part 43 and the second light-receiving part 49 may be separated by a central distance d greater than or equal to 1.0 mm.

As described above, the optical pick-up according to the example of the present application may be compatible with the BD 1*a*, the DVD 1*b*, and the CD 1*c* and thus the optical pick-up may record/reproduce on or from the BD 1*a*, the DVD 1*b*, and the CD 1*c*. However, the optical pick-up according to the example of the present application may be modified to be compatible only with the BD 1*a* and the DVD 1*b*. Also, the optical pick-up may be modified to be compatible with a plurality of different types of optical information storage media. Also, the optical pick-up may be modified to be used only with respect to the high-density optical information storage medium such as the BD 1*a* without the light source unit 21, the diffraction device 22, and the second objective lens 41. Also, the optical pick-up may be modified to be used with respect to another type of high-density optical information storage medium other than the BD 1*a*. Another example of the high-density optical information storage medium includes HD DVD.

Figure 5:
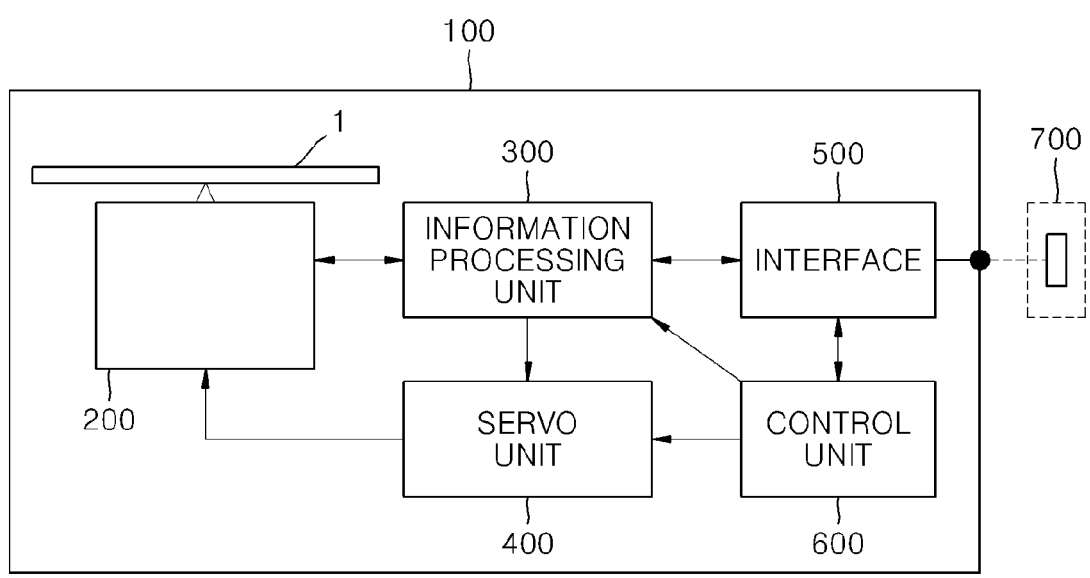
FIG. 5 illustrates an example of a configuration of an optical information storage medium system using an optical pick-up.

FIG. 5 schematically illustrates an example of a configuration of an optical information storage medium system 100 using an optical pick-up 200.

Referring to FIG. 5, the optical information storage medium system 100 includes the optical pick-up 200 and a control unit 600 configured to control the optical pick-up 200. The optical pick-up 200 may be configured to move in a radial direction of the optical information storage medium 1 and may reproduce information recorded on the optical information storage medium 1 or record information on the optical information storage medium 1.

As described above, the optical pick-up 200 may include an optical system having one of the aforementioned various configurations, and a mechanism system that mechanically supports the optical system and drives focusing and tracking operations. The optical system may include an encoder and a decoder. The optical system may be connected to an information processing unit 300, which may be connected to an interface 500 for connection with an external host, and the mechanism system may be connected to a servo unit 400. The control unit 600, for example, a central control unit may control the information processing unit 300, the servo unit 400, and the interface 500. The interface 500 may follow various standards, such as a universal serial bus (USB) port. Thus, the interface 500 may be connected to an external host, for example, a computer 700, according to a USB protocol, and exchanges information with the external host.

Hereinafter, the feature of an optical pick-up and an optical information storage medium system using the optical pick-up will now be described, and according to the feature, interference of a tracking error signal due to interlayer interference light may be decreased by reducing an interference affect generated between signal light and noise light. The signal light, may be reflected from a recording/reproducing layer of a multiplayer optical information storage medium having a small interlayer gap. The noise light may be reflected from a layer other than the recording/reproducing layer.

Figure 6A:
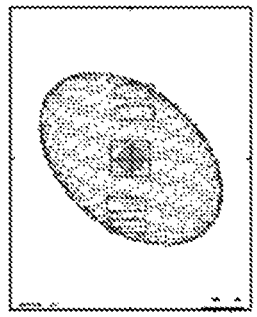
FIG. 6A illustrates an example of a signal light and an interlayer interference light reflected from a dual-recording layer optical information storage medium are received by the photo-detector while the signal light and the interlayer interference light overlap with each other.
Figure 6B:
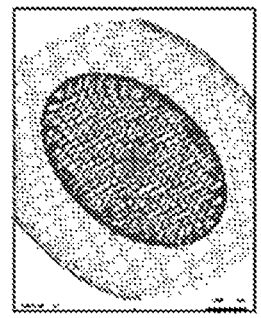
FIG. 6B illustrates an example of a signal light and an interlayer interference light reflected from a triple-recording layer optical information storage medium are received by the photo-detector while the signal light and the interlayer interference light overlap with each other.
Figure 6C:
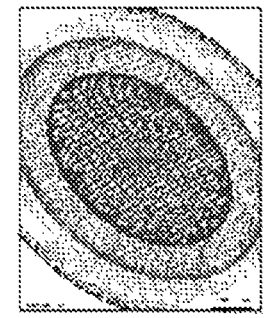
FIG. 6C illustrates an example of a signal light and an interlayer interference light reflected from a quadruple-recording layer optical information storage medium are received by the photo-detector while the signal light and the interlayer interference light overlap with each other.

FIGS. 6A through 6C illustrate examples in which interlayer interference light in a multilayer optical information storage medium is received by a photo-detector. FIG. 6A illustrates an example in which signal light and interlayer interference light that are reflected from a dual-recording layer optical information storage medium e.g. a BD are received by the photo-detector while they overlap with each other. FIG. 6B illustrates an example in which signal light and interlayer interference lights that are reflected from a triple-recording layer optical information storage medium e.g. a BD are received by the photo-detector while they overlap with each other. FIG. 6C illustrates an example in which signal light and interlayer interference lights that are reflected from a quadruple-recording layer optical information storage medium e.g. a BD are received by the photo-detector while they overlap with each other.

Figure 7:
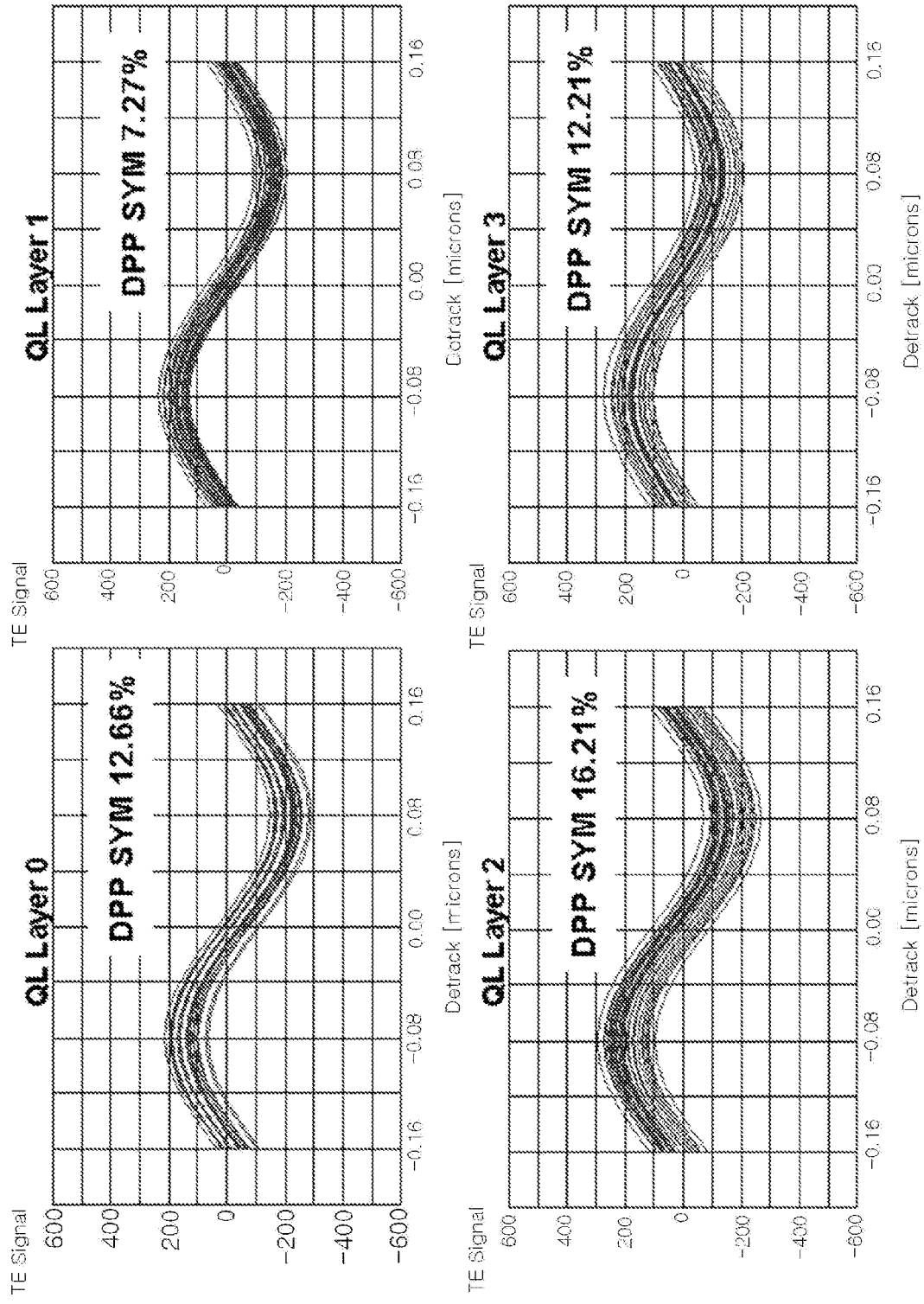
FIG. 7 illustrates an example of shaking of a tracking error signal in a multilayer optical information storage medium in response to a differential push-pull (DPP) method using three beams according to the related art being used.
Figure 8:
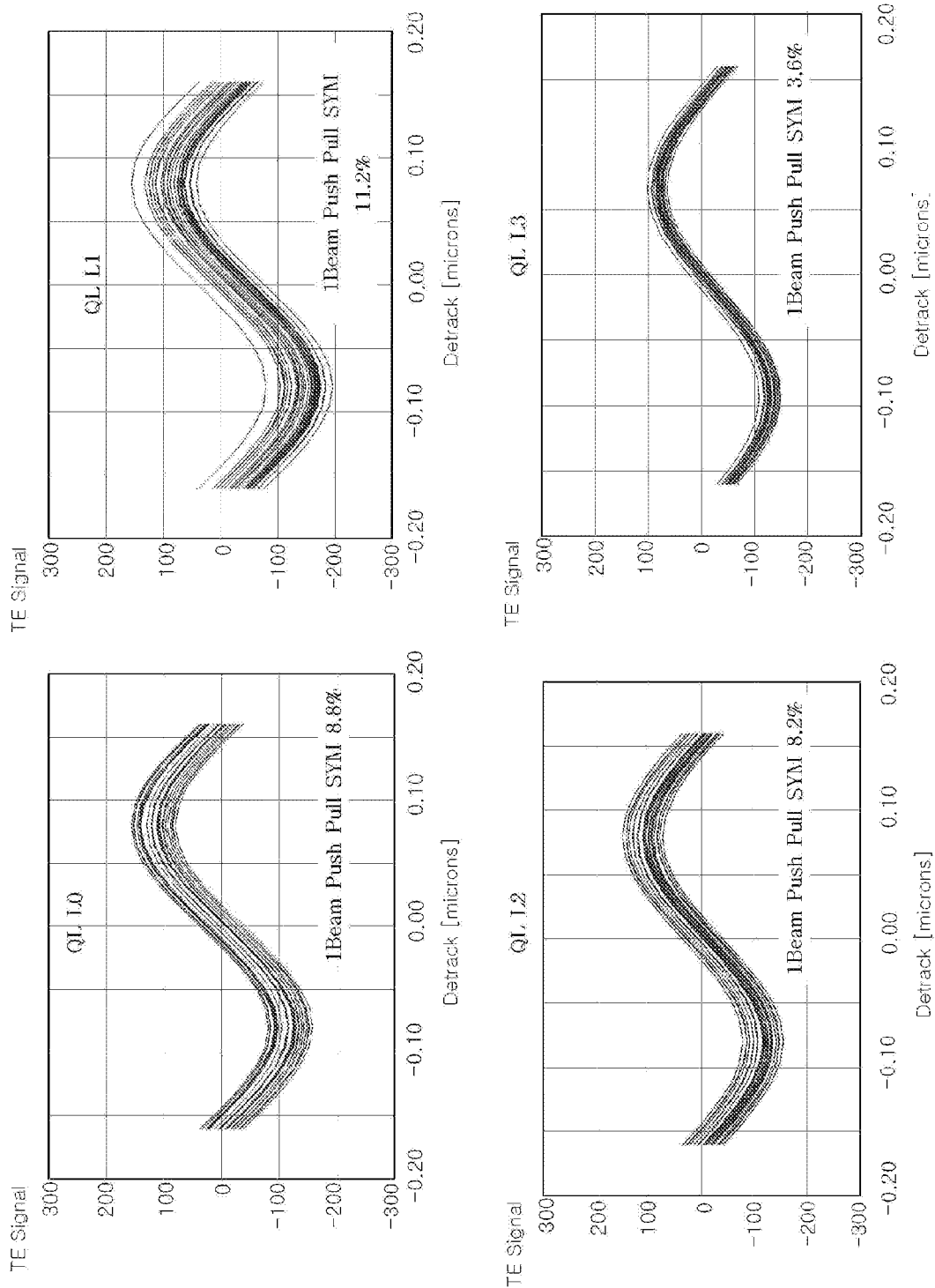
FIG. 8 illustrates an example of shaking of a tracking error signal in a multilayer optical information storage medium in response to a push-pull (PP) method using one beam according to the related art being used.

An affect due to interlayer interference light is shown in symmetry of a DPP signal DPP SYM that is shaking of a tracking error signal, and in this regard, in response to a DPP method using three beams according to the related art being used, the shaking of the tracking error signal in the multilayer optical information storage medium is shown in FIG. 7. Also, an example in which an affect due to interlayer interference light existing while one beam is used is shown in FIG. 8. FIGS. 7 and 8 illustrate examples of shaking of a three-beam DPP signal and shaking of a one-beam PP signal with respect to L0, L1, L2, and L3 layers of an optical information storage medium having four recording layers under the same condition.

Figure 9:
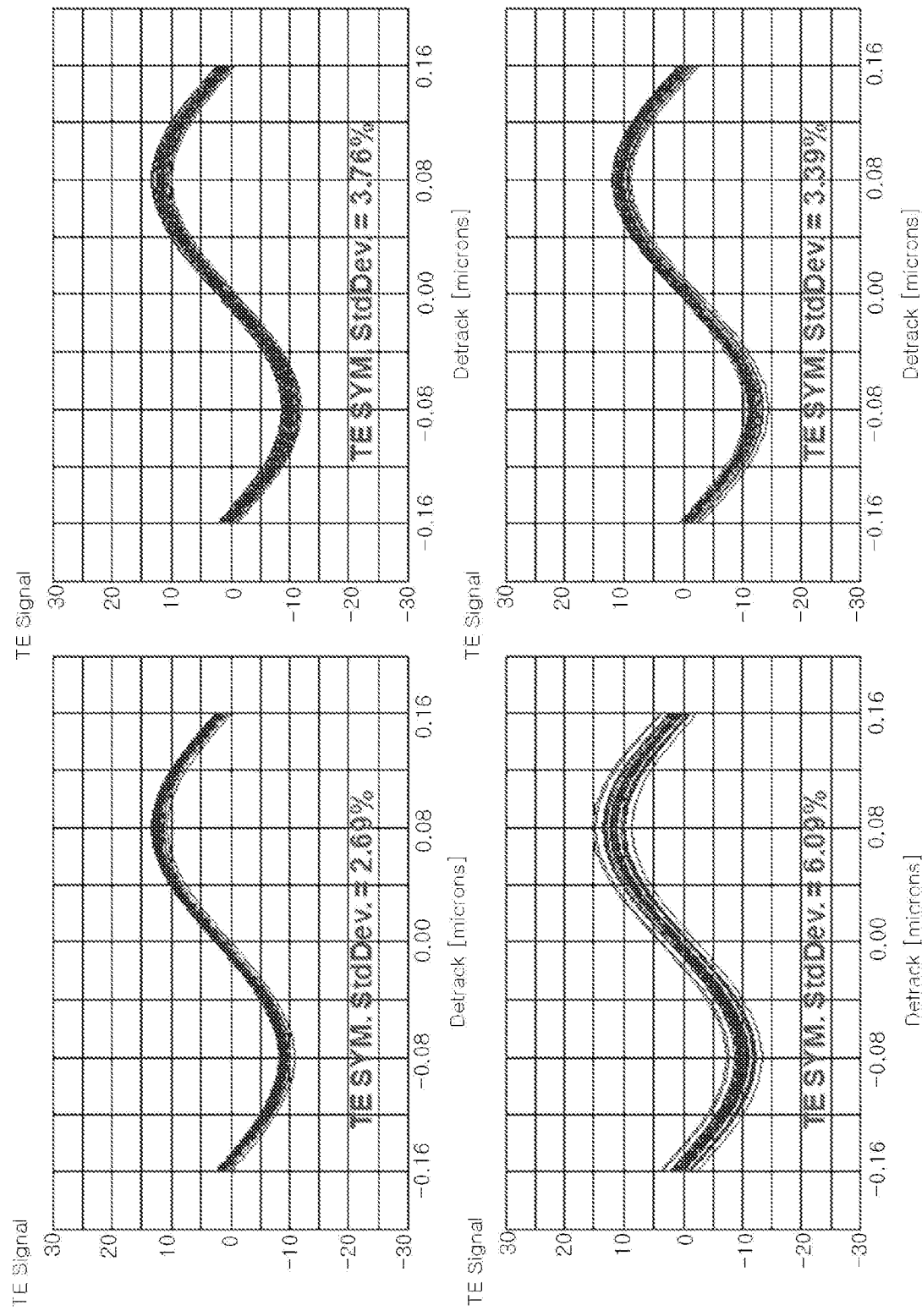
FIG. 9 illustrates an example of shaking of a tracking error signal.

FIG. 9 illustrates an example of shaking of a tracking error signal provided that an affect due to interlayer interference light is decreased using the blocking device 70 and the hologram device 90 as in the one or more examples of the present application, and other conditions are the same as the examples of FIGS. 7 and 8.

Figure 10:
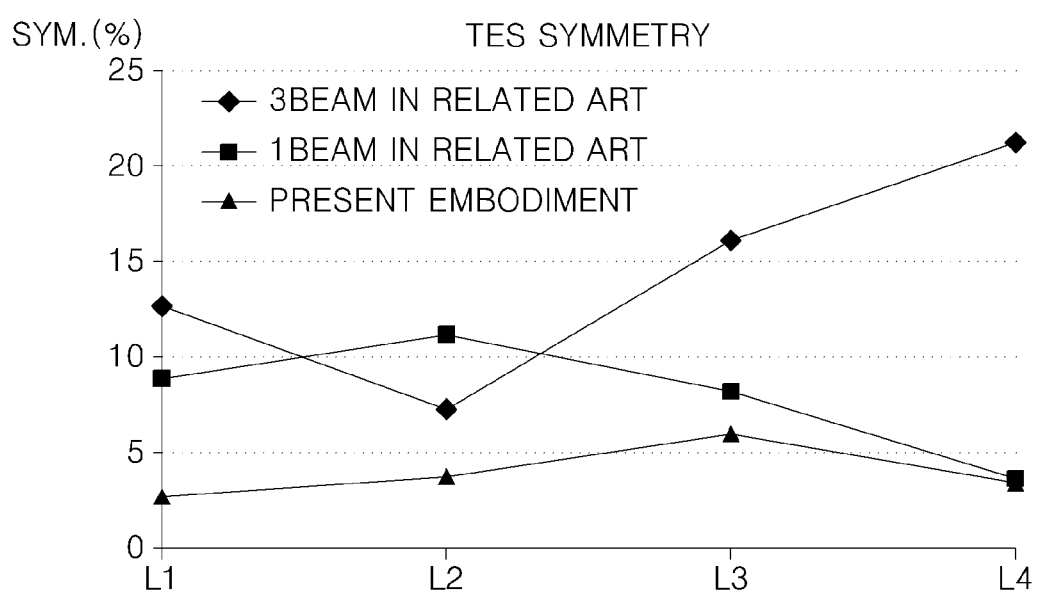
FIG. 10 illustrates a comparative graph showing a decrease in a shaking of a tracking error signal by using the optical pick-up according to the examples of the present application, compared to shaking of a tracking error signal by a three-beam DPP method or a one-beam PP method according to the related art.

Table 1 illustrates a comparison with respect to shaking of tracking error signals that are detected from L0, L1, L2, and L3 layers by performing a three-beam method and a one-beam method according to the related art, and a method according to one or more examples of the present application. FIG. 10 illustrates a graph showing symmetry of tracking error signals by performing the three-beam method and the one-beam method according to the related art, and the method according to one or more examples of the present application are performed.

TABLE 1

|  |  | L0 | L1 | L2 | L3 |
|---|---|---|---|---|---|
| Related art | Three-beam | 12.66% | 7.27% | 16.21% | 21.21% |
| | One-beam | 8.8% | 11.2% | 8.2% | 3.6% |
| Present example | | 2.7% | 3.8% | 6.0% | 3.4% |

As shown in Table 1, the comparison between the case of FIG. 9 and the cases of FIGS. 7 and 8, and the case of FIG. 10, the shaking of the tracking error signal is significantly decreased by using the optical pick-up according to the one or more examples of the present application, in comparison to an example of using the three-beam DPP method or the one-beam PP method according to the related art.

In the optical pick-up and the optical information storage medium system using the optical pick-up according to the one or more examples of the present application, an interference affect generated between signal light and noise light may be reduced, where the signal light is reflected from a recording/reproducing layer of a multilayer optical information storage medium having a small interlayer gap, and the noise light is reflected from a layer other than the recording/reproducing layer. Thus, a decrease in interference of a tracking error signal due to interlayer interference light is possible.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running. A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical pick-up comprising:
    a light source;
    a first objective lens configured to focus light emitted from the light source on a high-density optical information storage medium;
    a photo-detector configured to detect a signal by receiving light reflected from the high-density optical information storage medium;
    an optical-path changer configured to convert a travel path of incident light to allow the light emitted from the light source to proceed toward the high-density optical information storage medium, and to allow the light reflected from the high-density optical information storage medium to proceed toward the photo-detector;
    a blocking device disposed in an optical path of signal light reflected from a target reproducing/recording layer of the high-density optical information storage medium, passes through the first objective lens, and proceeds toward the photo-detector,
    wherein the blocking device includes a blocking region around a signal light transmission region to block interlayer interference light reflected from a layer other than the target reproducing/recording layer, in response to the high-density optical information storage medium having a plurality of recording layers, and
    in order to pass the signal light without blocking the signal light in response to the first objective lens being shifted due to actuating, the signal light transmission region of the blocking device is formed to configure a width of the signal light transmission region in the shift direction of the first objective lens is greater than a width of the signal light; and
    a hologram device disposed in an optical path between the blocking device and the photo-detector and having a hologram region configured to divide a portion of a light region of the signal light into $0^{th}$-order light and first-order light to obtain a tracking error signal from a detection signal of the first-order light.

2. The optical pick-up of claim 1, wherein the signal light is diffracted into $0^{th}$-order diffracted light, − first-order diffracted light, and + first-order diffracted light, and includes a first overlapping region in which the $0^{th}$-order diffracted light and the + first-order diffracted light overlap with each other, a second overlapping region in which the $0^{th}$-order diffracted light and the − first-order diffracted light overlap with each other, the second overlapping region being separate from the first overlapping region, and a non-overlapping region including the $0^{th}$-order diffracted light between the first overlapping region and the second overlapping region,
    the hologram device further comprises:
    a first hologram region that corresponds to a light region comprising the first overlapping region;
    a second hologram region that corresponds to a light region comprising the second overlapping region, the second hologram region being separate from the first hologram region in a radial direction;
    a light transmission region disposed between the first hologram region and the second hologram region and configured to transmit a central portion of the non-overlapping region of the signal light; and
    third and fourth hologram regions configured to bisect the rest of the portions of the non-overlapping region of the signal light in a radial direction,
    the first through fourth hologram regions configured to divide incident light into $0^{th}$-order light and first-order light, and
    the photo-detector comprises:
    a first light-receiving part configured to detect a reproducing signal or a focus error signal by detecting light that straightly passes through the hologram device; and
    a second light-receiving part configured to detect a tracking error signal from first-order lights diffracted in the first through fourth hologram regions.

3. The optical pick-up of claim 2, wherein the second light-receiving part comprises first through fourth light-receiving regions configured to receive the first-order lights diffracted in the first through fourth hologram regions, respectively, and
    in response to the first hologram region and the third hologram region being disposed in parallel, the second hologram region and the fourth hologram region being disposed in parallel, and detection signals of the first through fourth light-receiving regions being E, F, G, and H, the tracking error signal detected satisfies the following equation $$TES=(E-F)-k(G-H)$$

where, k is an adjusting coefficient.

4. The optical pick-up of claim 1, wherein the high-density optical information storage medium comprises a Blu-ray Disc (BD).

5. An optical information storage medium system comprising:
    the optical pick-up of claim 1, wherein the optical pick-up is mounted to be configured to move in a radial direction of an optical information storage medium, and reproduces information recorded on the optical information storage medium or records information on the optical information storage medium; and
    a control unit configured to control the optical pick-up.

6. The optical information storage medium system of claim 5, wherein the optical pick-up further comprises a hologram device disposed on an optical path between the blocking device and the photo-detector and that has a hologram region configured to divide a portion of a light region of the signal light into $0^{th}$-order light and first-order light so as to obtain a tracking error signal from a detection signal of the first-order light.

7. The optical information storage medium system of claim 6, wherein the signal light is diffracted into $0^{th}$-order diffracted light, − first-order diffracted light, and + first-order diffracted light, and includes a first overlapping region in which the $0^{th}$-order diffracted light and the + first-order diffracted light overlap with each other, a second overlapping region in which the $0^{th}$-order diffracted light and the − first-order diffracted light overlap with each other, the second overlapping region being separate from the first overlapping region, and a non-overlapping region including only the $0^{th}$-order diffracted light between the first overlapping region and the second overlapping region, the hologram device further comprises:
a first hologram region that corresponds to a light region comprising the first overlapping region;
a second hologram region that corresponds to a light region comprising the second overlapping region, the second hologram region being separate from the first hologram region in a radial direction;
a light transmission region disposed between the first hologram region and the second hologram region and configured to transmit a central portion of the non-overlapping region of the signal light; and
third and fourth hologram regions configured to bisect the rest of the portions of the non-overlapping region of the signal light in a radial direction,
the first through fourth hologram regions configured to divide incident light into $0^{th}$-order light and first-order light, and the photo-detector comprises:
a first light-receiving part configured to detect a reproducing signal or a focus error signal by detecting light that straightly passes through the hologram device; and
a second light-receiving part configured to detect a tracking error signal from first-order lights diffracted in the first through fourth hologram regions.

8. The optical information storage medium system of claim 7, wherein the second light-receiving part comprises first through fourth light-receiving regions configured to receive the first-order lights diffracted in the first through fourth hologram regions, respectively, and in order to the first hologram region and the third hologram region being disposed in parallel, the second hologram region and the fourth hologram region being disposed in parallel, and detection signals of the first through fourth light-receiving regions being E, F, G, and H, the tracking error signal detected satisfies the following equation TES=(E−F)−k(G−H)

where, k is an adjusting coefficient.

9. The optical information storage medium system of claim 5, further comprising a light source unit configured to emit a plurality of lights having different wavelengths that are appropriate for a plurality of low-density optical information storage media that have different recording densities and different formats; and
a second objective lens configured to converge incident light from the light source unit and form a light spot to record and/or reproduce on or from the plurality of low-density optical information storage media.

10. The optical pick-up of claim 1, further comprising a collimating lens disposed in the optical path between the light source and the first objective lens and configured to collimate light emitted by the optical-path changer.

11. The optical pick-up of claim 1, wherein the hologram device is disposed in the optical path of the signal light between the optical-path changer and the blocking device.

12. The optical pick-up of claim 1, wherein the signal light transmission region of the blocking device is formed to configure a width of the signal light transmission region in the shift direction of the first objective lens to be greater than a width of the signal light to enable the signal light to pass through the signal light transmission region when the first objective lens is shifted in a radial direction.

13. An optical pick-up comprising:
a light source;
a first objective lens configured to focus light emitted from the light source on a high-density optical information storage medium;
a light source unit configured to emit a plurality of lights having different wavelengths that are appropriate for a plurality of low-density optical information storage media having different recording densities and different formats;
a second objective lens configured to converge incident light from the light source unit and form a light spot to record and/or reproduce on or from the plurality of low-density optical information storage media;
a photo-detector configured to detect a signal by receiving light reflected from the high-density optical information storage medium;
an optical-path changer configured to convert a travel path of incident light to allow the light emitted from the light source and the light source unit to proceed toward the high-density optical information storage medium, and to allow the light reflected from the high-density optical information storage medium to proceed toward the photo-detector; and a blocking device disposed in an optical path of signal light reflected from a target reproducing/recording layer of the high-density optical information storage medium, passes through the first objective lens, and proceeds toward the photo-detector,
wherein the blocking device includes a blocking region around a signal light transmission region to block interlayer interference light reflected from a layer other than the target reproducing/recording layer, in response to the high-density optical information storage medium having a plurality of recording layers, and
in order to pass the signal light without blocking the signal light even in response to the first objective lens being shifted due to actuating, the signal light transmission region of the blocking device is formed to configure a width of the signal light transmission region in the shift direction of the first objective lens is greater than a width of the signal light; and
a hologram device disposed on an optical path between the blocking device and the photo-detector and having a hologram region configured to divide a portion of a light region of the signal light into $0^{th}$-order light and first-order light to obtain a tracking error signal from a detection signal of the first-order light.

14. The optical pick-up of claim 13, wherein the signal light is diffracted into $0^{th}$-order diffracted light, − first-order diffracted light, and + first-order diffracted light, and includes a first overlapping region in which the $0^{th}$-order diffracted light and the + first-order diffracted light overlap with each other, a second overlapping region in which the $0^{th}$-order diffracted light and the − first-order diffracted light overlap with each other, the second overlapping region being separate from the first overlapping region, and a non-overlapping region including the $0^{th}$-order diffracted light between the first overlapping region and the second overlapping region, the hologram device further comprises:
a first hologram region that corresponds to a light region comprising the first overlapping region;
a second hologram region that corresponds to a light region comprising the second overlapping region, the second hologram region being separate from the first hologram region in a radial direction;
a light transmission region disposed between the first hologram region and the second hologram region and configured to transmit a central portion of the non-overlapping region of the signal light; and
third and fourth hologram regions configured to bisect the rest of the portions of the non-overlapping region of the signal light in a radial direction,
the first through fourth hologram regions configured to divide incident light into $0^{th}$-order light and first-order light, and
the photo-detector comprises:
a first light-receiving part configured to detect a reproducing signal or a focus error signal by detecting light that straightly passes through the hologram device; and
a second light-receiving part configured to detect a tracking error signal from first-order lights diffracted in the first through fourth hologram regions, in response to the high-density optical information storage medium being recorded/reproduced.

15. The optical pick-up of claim 14, wherein the second light-receiving part comprises first through fourth light-receiving regions configured to receive the first-order lights diffracted in the first through fourth hologram regions, respectively, and
in response to the first hologram region and the third hologram region being disposed in parallel, the second hologram region and the fourth hologram region being disposed in parallel, and detection signals of the first through fourth light-receiving regions being E, F, G, and H, the tracking error signal detected satisfies the following equation TES=(E−F)−k(G−H)

where, k is an adjusting coefficient.

16. The optical pick-up of claim 14, further comprising a diffraction device configured to divide light incident from the light source unit into main light and sub-light,
wherein the photo-detector further comprises a third light-receiving part,
each of the first and third light-receiving parts of the photo-detector comprises a main light receiving part configured to receive the main light and a sub-light receiving part configured to receive the sub-light so as to detect an information signal or an error signal by receiving light reflected from the plurality of low-density optical information storage media, and
the main light receiving part of the first light-receiving part detects a reproducing signal or a focus error signal in response to the high-density optical information storage medium being recorded/reproduced.

17. The optical pick-up of claim 16, wherein the plurality of low-density optical information storage media comprise a digital versatile disc (DVD) and a compact disc (CD), and
the light source unit emits light having a first wavelength appropriate for the DVD, and light having a second wavelength appropriate for the CD.

18. The optical pick-up of claim 13, wherein the high-density optical information storage medium comprises a Blu-ray Disc (BD).

19. The optical pick-up of claim 13, wherein the signal light transmission region of the blocking device is formed to configure a width of the signal light transmission region in the shift direction of the first objective lens to be greater than a width of the signal light to enable the signal light to pass through the signal light transmission region when the first objective lens is shifted in a radial direction.

* * * * *